United States Patent Office 3,006,730
Patented Oct. 31, 1961

3,006,730
METHOD OF PRODUCING DIBORON
TETRACHLORIDE
Allen L. McCloskey, Orange, and Robert J. Brotherton and James L. Boone, Fullerton, Calif., assignors to United States Borax & Chemical Corporation, Los Angeles, Calif., a corporation of Nevada
No Drawing. Filed Nov. 9, 1959, Ser. No. 851,548
2 Claims. (Cl. 23—205)

This invention relates as indicated to a process for producing diboron tetrachloride.

Diboron tetrachloride has heretofore been produced by arc discharge and microwave excitation techniques. These prior art processes were exceedingly difficult to manipulate and were extremely costly due to the fact that they were only able to produce on the order of several grams of diboron tetrachloride per week. Consequently until the advent of the present invention diboron tetrachloride, while having exhibited many desirable properties, has remained a laboratory curiosity.

A few of the many uses of diboron tetrachloride are given in the following paragraph.

Diboron tetrachloride is an extremely effective dehydrating agent and reacts with water at low temperatures to produce hydrogen chloride. It is also a good reducing agent and can be used as an antioxidant because of its ready reaction with oxygen at temperatures as low as −80° C. Elemental boron is produced when diboron tetrachloride is heated to high temperatures in a reducing atmosphere. Gaseous diboron tetrachloride is ideally suited to be a catalyst in Friedel-Crafts type reactions because it can be easily brought into intimate contact with the reactive materials. Diboron tetrachloride can be used to produce polymers; for example, polymeric materials such as $(BNH)_x$ have been isolated from its reaction with ammonia. Diboron tetrachloride reacts with unsaturated compounds to give diboronic acid derivatives which are useful compounds and are very difficult or impossible to prepare by other methods.

By means of the present invention an improved process for producing diboron tetrachloride has been devised whereby this material may now be manufactured at a greatly reduced cost and, as a result thereof, diboron tetrachloride is removed from the list of laboratory curiosities and placed on the plane wherein it is feasible for use in commercial operations.

It is therefore the principal object of this invention to provide a new and economically desirable method for the preparation of diboron tetrachloride.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of producing diboron tetrachloride which comprises reacting boron monoxide with at least stoichiometric amounts of boron trichloride at a temperature of at least about 100° C. in a substantially anhydrous and oxygen-free atmosphere.

The reaction in the foregoing broadly stated paragraph can be graphically illustrated by the following general equation:

$$6BO + 4BCl_3 \rightarrow 3B_2Cl_4 + 2B_2O_3$$

We have found that a temperature of at least 100° C. is necessary for the production of the diboron tetrachloride, and in the preferred embodiment of our invention we use temperatures of from about 200 to 300° C. However, it is to be clearly understood that temperatures on the order of 500 to 600° C. or higher can be used; it only being important to the present process that a temperature of at least about 100° C. be maintained in order for the reaction to proceed. However, regardless of the temperature used it will be noted that the reaction is to be conducted in an anhydrous oxygen-free atmosphere.

As for the quantities of reactants, as noted above, it is necessary that at least stoichiometric amounts of boron trichloride are present. In the preferred embodiment of our invention we flood the reaction with boron trichloride and recirculate the excess for further reaction with boron monoxide.

So that the present invention is more clearly understood, the following illustrative example is given:

*Example I*

Boron monoxide was placed in the heated (200–250° C.) reaction zone of a flow system having an anhydrous oxygen-free atmosphere. Excess boron trichloride was passed over the heated boron monoxide at about 450 mm. pressure. The estimated boron trichloride residence time was about two to three minutes in the hot zone at the flow rate used.

The more volatile boron trichloride was separated from the resulting diboron tetrachloride by fractional distillation and returned to the system for further reaction with boron monoxide. The vapor pressure and infrared spectrum of the diboron tetrachloride were identical with the known vapor pressure and infrared spectrum data for diboron tetrachloride.

*Analysis.*—Calculated for $B_2Cl_4$: B, 13.3%; Cl, 86.7%. Found: B, 13.1%; Cl, 86.9%.

Other modes of applying the principle of the invention may be employed, change being made as regards the details described, provided the features stated in any of the following claims or the equivalent of such be employed.

We, therefore, particularly point out and distinctly claim as our invention:

1. The method of producing diboron tetrachloride which comprises reacting boron monoxide with at least stoichiometric amounts of boron trichloride at a temperature of at least about 100° C. in a substantially anhydrous oxygen-free atmosphere, and recovering diboron tetrachloride from the resultant reaction.

2. The method of producing diboron tetrachloride which comprises heating boron monoxide to a temperature of at least about 100° C. in a substantially anhydrous oxygen-free atmosphere, passing excess boron trichloride over said heated boron monoxide and separating the resulting diboron tetrachloride from the boron trichloride by fractional distillation.

References Cited in the file of this patent

Urry et al.: "The Preparation and Some of the Properties of Diboron Tetrachloride, $B_2Cl_4$," Journal of the American Chemical Society, vol. 76, No. 21, 1954, pages 5293–5298.

Thorpe: "Thorpe's Dictionary of Applied Chemistry," Longmans, Green and Co., New York, 4th edition, 1938, vol 2, page 45.